US011983116B2

(12) United States Patent
Do et al.

(10) Patent No.: US 11,983,116 B2
(45) Date of Patent: May 14, 2024

(54) STATISTIC BASED CACHE PRE-FETCHER

(71) Applicant: Huawei Technologies Co., Ltd., Shenzhen (CN)

(72) Inventors: Sang Wook Do, Glendale, CA (US); Wei-Yu Chen, Fremont, CA (US); Gang Liu, Palo Alto, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/973,427

(22) Filed: Oct. 25, 2022

(65) Prior Publication Data

US 2023/0049662 A1 Feb. 16, 2023

Related U.S. Application Data

(63) Continuation of application No. PCT/US2020/030543, filed on Apr. 29, 2020.

(51) Int. Cl.
*G06F 12/0862* (2016.01)
*G06F 9/32* (2018.01)
*G06F 12/0811* (2016.01)

(52) U.S. Cl.
CPC .......... *G06F 12/0862* (2013.01); *G06F 9/321* (2013.01); *G06F 12/0811* (2013.01)

(58) Field of Classification Search
CPC .. G06F 9/321; G06F 12/0811; G06F 12/0862; G06F 2212/1016; G06F 2212/502; G06F 2212/6024; G06F 2212/6026
See application file for complete search history.

(56) References Cited

U.S. PATENT DOCUMENTS

| 6,976,147 | B1 | 12/2005 | Isaac et al. |
| 9,032,159 | B2 | 5/2015 | Ramani-Augustin et al. |
| 9,430,240 | B1* | 8/2016 | Atta ...................... G06F 9/3851 |
| 2015/0026414 | A1 | 1/2015 | Kalamatianos et al. |

(Continued)

OTHER PUBLICATIONS

International Search Report & the Written Opinion of the International Searching Authority dated Jan. 27, 2021, International Application No. PCT/US2020/030543.

(Continued)

*Primary Examiner* — Larry T MacKall
(74) *Attorney, Agent, or Firm* — Vierra Magen Marcus LLP

(57) ABSTRACT

The disclosure relates to technology for pre-fetching data. An apparatus comprises a processor core, pre-fetch logic, and a memory hierarchy. The pre-fetch logic is configured to generate cache pre-fetch requests for a program instruction identified by a program counter. The pre-fetch logic is configured to track one or more statistics with respect to the cache pre-fetch requests. The pre-fetch logic is configured to link the one or more statistics with the program counter. The pre-fetch logic is configured to determine a degree of the cache pre-fetch requests for the program instruction based on the one or more statistics. The memory hierarchy comprises main memory and a hierarchy of caches. The memory hierarchy further comprises a memory controller configured to pre-fetch memory blocks identified in the cache pre-fetch requests from a current level in the memory hierarchy into a higher level of the memory hierarchy.

19 Claims, 12 Drawing Sheets

(56) References Cited

U.S. PATENT DOCUMENTS

| | | | |
|---|---|---|---|
| 2016/0117250 A1 | 4/2016 | Lee et al. | |
| 2017/0322885 A1 | 11/2017 | Mukherjee et al. | |
| 2018/0018266 A1* | 1/2018 | Jones, III | G06F 12/0811 |
| 2018/0341591 A1 | 11/2018 | Drerup et al. | |
| 2019/0179757 A1 | 6/2019 | Walker et al. | |

OTHER PUBLICATIONS

International Preliminary Report on Patentability dated Nov. 10, 2022, International Application No. PCT/US2020/030543.

Sklenar, Ivan, "Prefetch Unit for Vector Operations on Scalar Computers," Abstract, The Institute of Physics CSAV, Apr. 1999, 1 page.

Fu, John W.C., et al., "Stride Directed Prefetching in Scalar Processors," Proceedings the 25th Annual International Symposium on Microarchitecture MICRO 25, Aug. 2002, 9 pages.

Kim, Sunil, et al., "Stride-directed Prefetching for Secondary Caches," Proceedings of the 1997 International Conference on Parallel Processing, Aug. 2002, 8 pages.

Michaud, Pierre, "Best-Offset Hardware Prefetching," 2016 IEEE International Symposium on High Performance Computer Architecture (HPCA), Apr. 2016, 12 pages.

Chen, Tien-Fu, et al., "Effective Hardware-Based Data Prefetching for High-Performance Processors," IEEE Transactions on Computers, vol. 44, No. 5, May 1995, 5 pages.

Kondguli, Sushant, et al., "T2: a Highly Accurate and Energy Efficient Stride Prefetcher," 2017 IEEE International Conference on Computer Design (ICCD), Nov. 2017, 10 pages.

Smith, Alan Jay, "Cache Memories," Computing Surveys, vol. 14, No. 3, Sep. 1982, 58 pages.

Falsafi, Babak, et al., "A Primer on Hardware Prefetching," Synthesis Lectures Computer Architecture, Morgan & Claypool Publishers, Jun. 2014, 69 pages.

* cited by examiner

| program counter | count |
|---|---|
| 1256 | 4 |
| 1389 | 5 |
| ⋮ | ⋮ |
| 2289 | 11 |
| 1548 | 0 |
| 7891 | 2 |

FIG. 5C

| program counter | count |
|---|---|
| 1256 | 4 |
| 1389 | 5 |
| ⋮ | ⋮ |
| 2289 | 11 |
| 3346 | 0 |
| 7891 | 2 |

| program counter (704) | stride (708) | stride confidence (710) | count (706) |
|---|---|---|---|
| 1458 | 2 | 2 | 2 |
| 7789 | 5 | 3 | 4 |
| ... | ... | ... | ... |
| 0769 | -3 | 1 | 7 |
| 6547 | 4 | 5 | 1 |
| 2236 | 8 | 2 | 11 |

702 braces the data rows.

| program counter (804) | stride (806) | stride confidence (808) | start time (810) | elapsed time (812) |
|---|---|---|---|---|
| 1896 | 4 | 2 | 01/15/20 7:32:15 | 0:15:17 |
| 2589 | 3 | 1 | 01/15/20 7:38:20 | 0:5:03 |
| ... | ... | ... | ... | ... |
| 8854 | 8 | 2 | 01/15/20 6:15:45 | 1:25:17 |
| 2158 | -4 | 3 | 01/15/20 4:35:25 | 2:15:25 |
| 3651 | 2 | 5 | 01/15/20 7:56:18 | 0:01:05 |

802 braces the data rows.

| program counter | pre-fetch usefulness (PUF) | pre-fetched | memory block |
|---|---|---|---|
| 1268 | 1 | 1 | |
| 6594 | 7 | 1 | |
| ⋮ | ⋮ | ⋮ | ⋮ |
| 3218 | 14 | 1 | |
| | | 0 | |

1004 → program counter
1006 → pre-fetch usefulness (PUF)
1008 → pre-fetched
1010 → memory block
1002 → rows

STATISTIC BASED CACHE PRE-FETCHER

CLAIM OF PRIORITY

This application is a continuation of PCT Patent Application No. PCT/US2020/030543, entitled "STATISTIC BASED CACHE PRE-FETCHER", filed Apr. 29, 2020, the entire contents of which is hereby incorporated by reference.

FIELD

The disclosure generally relates to caches in a computing system.

BACKGROUND

A computing system may use a cache memory to improve computing performance. For instance, a computing system may store data that it needs to access more frequently in a smaller, faster cache memory instead of storing the data in a slower, larger memory (e.g., in a main memory unit). Accordingly, the computing system is able to access the data quicker, which can reduce the latency of memory accesses.

A computing system may have a hierarchy of caches that are ordered in what are referred to herein as cache levels. Typically, the cache levels are numbered from a highest level cache to a lowest level cache. There may be two, three, four, or even more levels of cache in the cache hierarchy. Herein, a convention is used to refer to the highest level cache with the lowest number, with progressively lower levels receiving progressively higher numbers. For example, the highest level cache in the hierarchy may be referred to as cache level 1 (L1). Here, the lower level cache levels may be referred to as L2, L3, L4, etc. Cache level 1 (L1) is typically a small, fast cache near the processor. The lowest level cache is typically referred to as a last level cache (LLC).

When a processor needs data (referred to as target data), the processor typically requests the target data from the highest level cache (e.g., L1). If the target data is not in a cache, this is referred to as a cache miss. In the event of a cache miss, the next level cache is typically examined to determine if the target data is at the next level cache. This process is typically repeated until the highest level cache is searched for the target data. If none of the caches have the target data, then the target data is accessed from main memory.

BRIEF SUMMARY

According to one aspect of the present disclosure, there is provided an apparatus comprising an apparatus for pre-fetching data. The apparatus comprises a processor core, pre-fetch logic, and a memory hierarchy. The pre-fetch logic is configured to generate cache pre-fetch requests for a program instruction identified by a program counter. The pre-fetch logic is configured to track one or more statistics with respect to the cache pre-fetch requests. The pre-fetch logic is configured to link the one or more statistics with the program counter. The pre-fetch logic is configured to determine a degree of the cache pre-fetch requests for the program instruction based on the one or more statistics. The memory hierarchy comprises main memory and a hierarchy of caches. The memory hierarchy further comprises a memory controller configured to pre-fetch memory blocks identified in the cache pre-fetch requests from a current level in the memory hierarchy into a higher level of the memory hierarchy.

Optionally, in any of the preceding aspects, the pre-fetch logic comprises logic configured to track a count of cache pre-fetch requests that are generated for the program instruction over a recent interval, wherein the one or more statistics comprise the count.

Optionally, in any of the preceding aspects, the pre-fetch logic is configured to adjust the degree of the cache pre-fetch requests for the program instruction based on the count of cache pre-fetch requests that are generated for the program instruction over the recent interval.

Optionally, in any of the preceding aspects, the apparatus further comprises a pre-fetch statistics cache. The pre-fetch logic is further configured to store the program counter that identifies the program instruction linked with the count of cache pre-fetch requests that are generated for the program instruction over the recent interval in the pre-fetch statistics cache.

Optionally, in any of the preceding aspects, the pre-fetch logic is configured to increment the count that is linked with the program counter in the pre-fetch statistics cache in response to a cache pre-fetch request being generated for the program instruction identified by the program counter.

Optionally, in any of the preceding aspects, the pre-fetch logic is configured to decrement the count that is linked with the program counter in the pre-fetch statistics cache in response to a cache pre-fetch request being generated for a program instruction identified by a program counter that is not in the pre-fetch statistics cache.

Optionally, in any of the preceding aspects, the pre-fetch logic is configured to add an entry to the pre-fetch statistics cache in response to a cache pre-fetch request being generated for the program instruction identified by the program counter that is not in the pre-fetch statistics cache.

Optionally, in any of the preceding aspects, the pre-fetch logic is configured to remove an entry in the pre-fetch statistics cache in response to a cache pre-fetch request being generated for a program instruction identified by a program counter that is not in the pre-fetch statistics cache.

Optionally, in any of the preceding aspects, the pre-fetch logic is configured to determine a stride confidence for a stride for the program instruction identified by the program counter. The pre-fetch logic is configured to generate the cache pre-fetch requests based on the stride confidence.

Optionally, in any of the preceding aspects, the pre-fetch logic comprises logic configured to track how much time has elapsed for the stride to reach a current stride confidence, wherein the one or more statistics comprise the elapsed time.

Optionally, in any of the preceding aspects, the pre-fetch logic is configured to determine the degree of the cache pre-fetch requests for the program instruction identified by the program counter based on the elapsed time and the current stride confidence.

Optionally, in any of the preceding aspects, the apparatus further comprises a pre-fetch statistics cache. The pre-fetch logic is configured to store the program counter identified by the program instruction linked to the elapsed time for the stride to reach the current stride confidence in the pre-fetch statistics cache.

Optionally, in any of the preceding aspects, the pre-fetch logic is configured to store a start time in the pre-fetch statistics cache in response to a new stride being determined for the program instruction identified by the program counter.

Optionally, in any of the preceding aspects, the pre-fetch logic is configured to store the elapsed time in the pre-fetch statistics cache in response to a change in the stride confidence for the program instruction identified by the program counter.

Optionally, in any of the preceding aspects, the pre-fetch logic comprises logic is configured to store the program counter in association with a memory block that is pre-fetched into a cache at the higher level of the memory hierarchy in response to one of the cache pre-fetch requests. The pre-fetch logic comprises logic comprises logic configured to track a pre-fetch usefulness feedback that indicates whether the memory block in the cache at the higher level of the memory hierarchy is demanded by a processor. The one or more statistics comprise the pre-fetch usefulness feedback. The pre-fetch logic comprises logic configured to report the program counter with the pre-fetch usefulness feedback to the cache pre-fetcher.

Optionally, in any of the preceding aspects, the pre-fetch logic is configured to determine the degree of the cache pre-fetch requests for the program instruction identified by the program counter based on the pre-fetch usefulness feedback associated with the program counter.

Optionally, in any of the preceding aspects, the pre-fetch logic comprises a hardware cache pre-fetcher.

Optionally, in any of the preceding aspects, the pre-fetch logic comprises a stride pre-fetcher.

According to one other aspect of the present disclosure, there is provided a method of performing cache pre-fetches. The method comprises tracking one or more statistics with respect to cache pre-fetch requests associated with a program instruction identified by a program counter. The method comprises linking the one or more statistics with the program counter. The method comprises generating cache pre-fetch requests associated with the program instruction identified by the program counter, including determining a degree of the cache pre-fetch requests associated with the program instruction on the one or more statistics. The method comprises pre-fetching memory blocks identified in the cache pre-fetch requests from a current level in a memory hierarchy into a higher level of the memory hierarchy.

According to still one other aspect of the present disclosure, there is provided a computer system, comprising a processor configured to execute program instructions, wherein each program instruction is identified by a program counter. The computer system comprises a cache pre-fetcher configured to generate cache pre-fetch requests for a subject program instruction identified by a subject program counter, wherein the cache pre-fetch requests have a degree. The computer system comprises a memory hierarchy comprising main memory and a hierarchy of caches. The memory hierarchy further comprises a memory controller configured to pre-fetch memory blocks identified in the cache pre-fetch requests from a current level in the memory hierarchy into a higher level of the memory hierarchy. The computer system comprises pre-fetch statistics logic configured to track one or more statistics with respect to the cache pre-fetch requests for the subject program instruction, wherein the one or more statistics are linked to the subject program counter. The pre-fetch statistics logic is further configured to adjust the degree of the cache pre-fetch requests for the subject program instruction based on the one or more statistics for the subject program counter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 5A-5D depict embodiments of a pre-fetch statistics cache.

FIG. 7 depicts one embodiment of a pre-fetch statistics cache that may be used in connection with stride pre-fetching.

FIG. 8 depicts one embodiment of a pre-fetch statistics cache that tracks elapsed time since a change in stride confidence.

DETAILED DESCRIPTION

Figure 1:
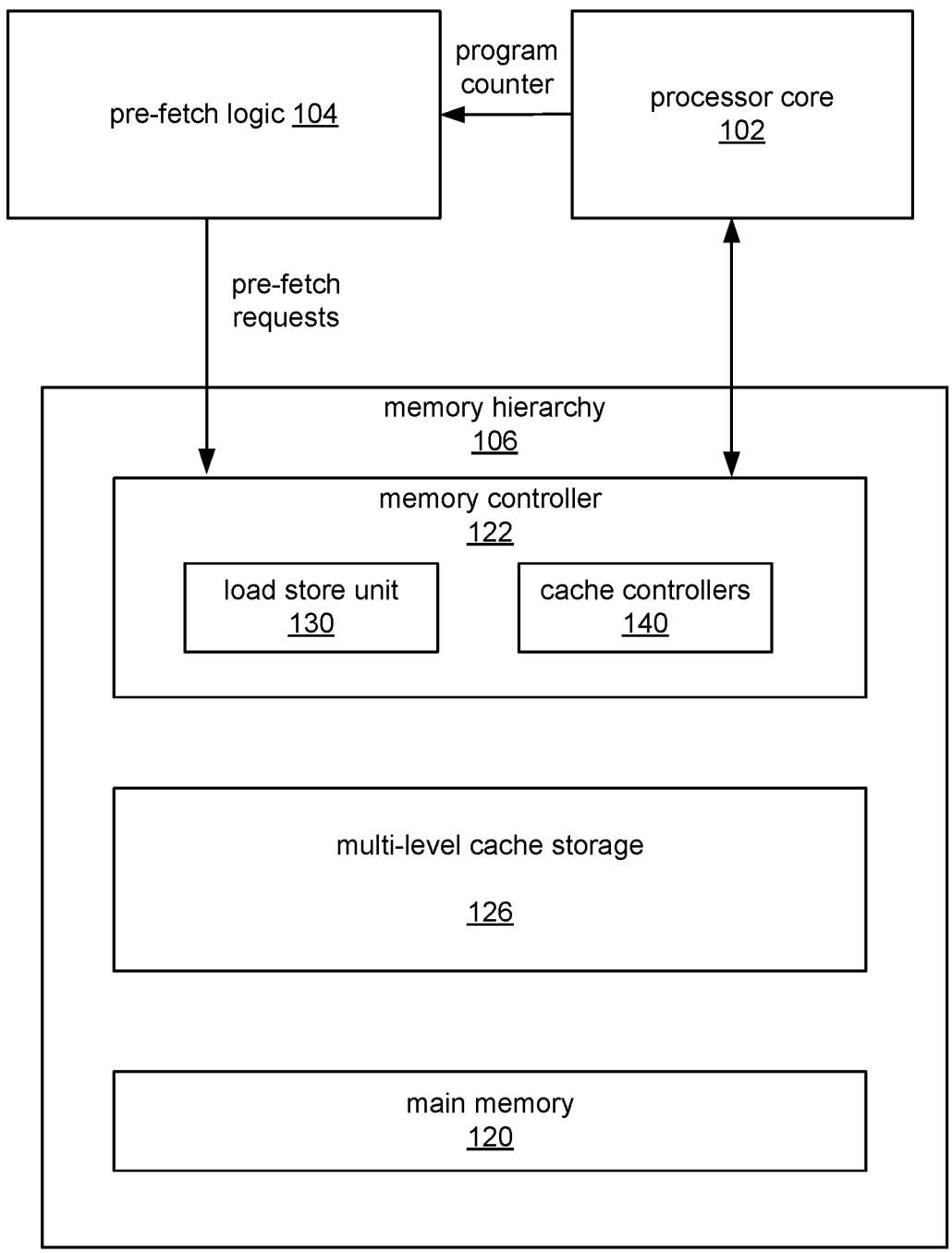
FIG. 1 depicts one embodiment of a system (or apparatus) for pre-fetching data.

The present disclosure will now be described with reference to the figures, which in general relate to cache pre-fetching a memory block. A memory block is a basic unit of storage in a memory hierarchy. The memory block may also be referred to as a cache block or as a cache line. Herein, a "cache pre-fetch" is defined as a fetch of a memory block from its current location in a memory hierarchy into a cache at a higher level in the memory hierarchy prior to a demand from a processor core for the memory block. The term "pre-fetch" may be used herein instead of "cache pre-fetch"

for brevity. The current location in the memory hierarchy refers to the highest level in the memory hierarchy at which the memory block currently resides. The cache pre-fetch could be a pre-fetch of data or a pre-fetch of one or more program instructions. Thus, the memory block could contain either data, or one or more program instructions. The cache pre-fetch is typically associated with a particular program instruction. For example, the program instruction may be a load instruction that is to load data having an address in main memory. The cache pre-fetch may pre-fetch the data from the main memory (or a higher level in the memory hierarchy) prior to demand for the data by the processor core.

The cache pre-fetch is made based on a likelihood that there will be an upcoming demand or need for the memory block from a processor core. Once the demand for the memory block has been received, the memory block can be accessed much faster from the cache than if the memory block was still at a lower level of the memory hierarchy. However, it is possible that the pre-fetched memory block will not be demanded by the processor core, which means that the space in the higher level cache is not used efficiently. Pre-fetching the memory block may result in an eviction of a victim memory block from cache storage. If there is a demand for the victim memory block but not for the pre-fetched memory block, performance can actually be degraded. Also, the pre-fetch requests use bandwidth in the memory hierarchy. Hence, the pre-fetch requests that do not lead to a demand for a pre-fetched memory block may waste bandwidth in the memory hierarchy.

In one embodiment, pre-fetch logic generates one or more pre-fetch requests for a program instruction, such as a load instruction. To generate a pre-fetch request for a program instruction means that the pre-fetch request is generated based on the fact that the program instruction is among a set of program instructions that are executed by a processor core. The pre-fetch request may be generated in response to the processor core executing the program instruction, but that is not a requirement. The program instruction may be identified by a particular value of the program counter. For brevity, the phrase "the program instruction may be identified by the program counter", or the like, will be understood to mean that the program instruction may be identified by a particular value of the program counter.

The pre-fetch logic tracks one or more statistics with respect to the pre-fetch requests for the program instruction. Also, the one or more statistics are linked with the program counter, which helps the one or more statistics to be relevant to the program instruction that is identified by the program counter. For example, the pre-fetch logic could use the program counter to search a pre-fetch statistic cache in order to obtain one or more statistics that are highly relevant to the program instruction identified by the program counter. The pre-fetch logic determines how many pre-fetch requests to generate for the program instruction based on the one or more statistics. For example, the pre-fetch logic is configured to use the one or more statistics to determine how many pre-fetch requests should be generated in response to the program instruction that is being executed. The number of pre-fetch requests for a given program instruction (at one point in time) is referred to as the pre-fetch degree. Thus, the pre-fetch logic may determine the pre-fetch degree based on the one or more statistics. In one embodiment, the pre-fetch logic accesses a "default" pre-fetch degree that is generated without regard to the one or more statistics, and may increase or decrease the default pre-fetch degree based on the one or more statistics. Determining the pre-fetch degree based on the one or more statistics leads to efficient operation of the computer system. For example, the one or more statistics may suggest that increasing the default pre-fetch degree will improve efficiency of the computer system. Alternatively, the one or more statistics may suggest that decreasing the default pre-fetch degree will improve efficiency of the computer system.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous details are set forth in order to provide a thorough understanding. However, it will be clear to those of ordinary skill in the art that the present embodiments of the disclosure may be practiced without such details.

FIG. 1 depicts one embodiment of a system (or apparatus) for determining a degree for pre-fetching memory blocks based on one or more statistics. The system 100 includes a processor core 102, pre-fetch logic 104, and a memory hierarchy 106. The processor core 102 may also be referred to as a central processing unit (CPU). The memory hierarchy 106 stores data and/or program instructions, which are provided to the processor core 102 in response to a demand from the processor core 102.

As is well-understood, a processor core 102 may execute program instructions. Herein, a "program instruction" is defined as an instruction that is executable on a processor (e.g., microprocessor or CPU). Typically, a processor core 102 has a program counter (PC) that contains a value that uniquely defines the program instruction. For example, during sequential execution of the program instructions, the program counter may be incremented by one with execution of each program instruction. As is well understood by those of ordinary skill in the art, it is possible for the program instructions to be executed non-sequentially, such as with branch instructions. Thus, the value in the program counter could be increased or decreased by more than one.

The memory hierarchy 106 includes multi-level cache storage 126, main memory 120, and a memory controller 122. The multi-level cache storage 126 includes multiple cache levels. For example, the multi-level cache storage 126 may include level 1 (L1) cache, level 2 (L2) cache, and last level cache (LLC). There could be additional levels of cache. The memory controller 122 is configured to control access to the cache storage 126 and the main memory 120. The memory controller 122 contains a load store unit (LSU) 130 and one or more cache controllers 140. The load store unit 130 is responsible for executing all load and store instructions. The load store unit 130 provides data transfer between storage in the memory hierarchy 106 (e.g., multi-level cache 126, main memory 120) and registers in the processor core 102. In one embodiment, there is a cache controller 140 for each cache level. Each cache controller 140 is responsible for managing a cache in the multi-level cache 126. For example, when a cache controller 140 receives a request for a memory block, it checks the address of the memory block to determine whether the memory block is in the cache. If the memory block is in the cache, memory block may be read from the cache. If the memory block is not in the cache (referred to as a cache miss), the cache controller 140 sends a request to a lower level cache (i.e., a cache closer to main memory 120), or to main memory if there is not a cache closer to main memory 120. Cache controllers are typically implemented in hardware.

In one embodiment, the processor core 102 sends demands to the memory hierarchy 106 for target memory blocks. These demands may occur in response to the processor core 102 executing a program instruction such as, but not limited to, a load instruction. In one embodiment, the demands are sent to the load/store unit (LSU) 130 in the memory controller 122. The cache controllers 140 in the memory controller 122 may search progressively lower levels of the multi-level cache storage 126 for the target memory block. If the target memory block is not found at any level of the multi-level cache storage 126, then the main memory 120 is searched. If the target memory block is not found in the memory hierarchy 106, another memory such as a solid state drive (or hard disk drive) may be searched for the target memory block. The amount of time it takes to provide the memory block to the processor core 102 increases greatly with each further level that is searched. In one embodiment, the target memory block, once located, is cached at a highest level of the multi-level cache 126 (such as an L1 cache) because, in general, a memory block demanded by the processor core 102 may be demanded again in the near future. However, due to the limited space in the highest level cache, if there is no available space in the highest level cache for the target memory block, an existing memory block is chosen as a "victim" and is then evicted out of the highest level cache to make a room for the target memory block. In one embodiment, the process of evicting and replacing the victim memory block and the caching of the target memory block is based on a replacement algorithm. In some cases, the memory block is pre-fetched to a level other than the highest level, such as an L2 cache. If the target memory block is found in the cache storage 126, the processor core 102 experiences a smaller delay than if the target memory block is in the main memory 120. If the target memory block is in a cache level that is very close to the processor core 102, the delay may be only one cycle execution time.

In some embodiments, the pre-fetch logic comprises control logic, arithmetic logic, and storage. The arithmetic logic may be used for operations such as determining a next pre-fetch address. The storage may be used to store one or more statistics about pre-fetch requests. The control logic may be used to track statistics, store and access statistics from the storage, as well as to control the arithmetic logic. The pre-fetch logic 104 may be implemented in hardware. In one embodiment, the pre-fetch logic 104 includes a hardware pre-fetcher, which refers to a pre-fetcher that is implemented in hardware. In one embodiment, the pre-fetch logic 104 is implemented using discrete circuitry. For example, the pre-fetch logic 104 may be implemented using discrete logic, which may include but is not limited to NAND gates and/or NOR gates. The pre-fetch logic 104 is able to significantly reduce such delays in providing target memory blocks by pre-fetching memory blocks. The pre-fetches are in addition to the demands for memory blocks made by the processor core 102. The cache pre-fetch selection is made based on a likelihood that there will be a demand for the memory block from the processor core 102 in the future. In some embodiments, a stride pre-fetcher determines what memory blocks should be pre-fetched. If there is future demand for the memory block, then the memory block can be accessed much faster than if the memory block were still only at a lower level of the memory hierarchy 106. However, it is possible that the pre-fetched memory block will not be demanded by the processor core 102, which means that space in the higher level cache (e.g., L1 cache) is not used efficiently. Pre-fetching the memory block may result in an eviction of a victim memory block. If there is a demand for the victim memory block but not for the pre-fetched memory block, performance is degraded. Also, the pre-fetch requests use bandwidth in the memory hierarchy 106. Hence, the pre-fetch requests that do not lead to a demand for a pre-fetched memory block waste bandwidth in the memory hierarchy 106.

In some embodiments, the pre-fetch logic 104 issues one or more pre-fetch requests to the memory hierarchy 106 for a program instruction that is executed by the processor core 102. The program instruction may be an instruction that accesses the memory hierarchy 106 such as, but not limited to, a load instruction. In one embodiment, the pre-fetch logic 104 monitors program instructions that are executed by the processor core 102, such that pre-fetch requests may be generated in response to execution of certain types of program instructions such as load instructions. In one embodiment, the pre-fetch logic has access to the program counter, which may be used to uniquely identify a program instruction.

Each pre-fetch request associated with a given program instruction at one point in time is for a different memory block. As one example, if the program instruction is an access of a memory block at memory address X, then the pre-fetch logic 104 might issue pre-fetch requests for memory blocks at memory addresses X+a, X+2a, and X+3a. The term a may be any integer (positive or negative) and may be referred to as a stride. In this example, there is a likelihood that subsequent requests will be for the subsequent memory blocks as indicated by these memory addresses. The number of such pre-fetch requests that are issued by the pre-fetch logic 104 is referred to as the degree of pre-fetch (or "pre-fetch degree").

Embodiments of the pre-fetch logic 104 determine a suitable degree of the pre-fetch requests for a program instruction for efficient operation. For example, if too few pre-fetch requests are issued, then an opportunity to save substantial time by moving a memory block up in the memory hierarchy 106 may be missed. On the other hand, if too many pre-fetch requests are issued, then a memory block that is later demanded by the processor core 102 could be evicted from the highest level cache (or another level) without the benefit of a pre-fetched memory block being demanded by the processor core 102. In other words, some of the pre-fetched memory blocks might not be demanded by the processor core 102. Thus, determining a likelihood that a memory block will be requested not only includes determining the next memory block, but an additional number of memory blocks that is most likely to satisfy memory block requests without pre-fetching memory blocks that will not be requested.

The pre-fetch logic 104 is configured to track one or more statistics with respect to the cache pre-fetch requests. In one embodiment, the one or more statistics are tracked for a particular program instruction to make the determinations regarding the likelihood that a memory block will be requested. In an embodiment, the degree of the cache pre-fetch requests for a particular program instruction are determined based on the one or more statistics for that particular program instruction. Using the one or more statistics helps to determine a suitable pre-fetch degree for efficient operation of the system 100. In some embodiments, the one or more statistics are linked with the program counter that identifies the program instruction for which the pre-fetch requests were issued. This allows the one or more statistics to be tailored to the program instruction, which helps to determine a suitable pre-fetch degree for efficient operation of the system 100.

One example of a statistic that may be tracked for a particular program instruction is a count of how many times a pre-fetch request is generated for the particular program instruction. The count may be tracked over a recent interval to make the count more relevant. The term recent is being used in its ordinary and broad meaning of "belonging to a past period of time relatively close to the present." Herein, the term "recent" in "recent interval" means that the interval is between the present time and some recent point in the past. In some embodiment, the recent interval is measured in terms of clock cycles of the processor core 102. For example, the recent interval could be the last 100 clock cycles of the processor core 102. However, the recent interval could be more or fewer than 100 clock cycles. Tracking the count of pre-fetch requests over a recent internal means that older pre-fetch requests will be ignored in the count. In one embodiment, the pre-fetch degree for the particular program instruction is determined based on the count of how many times a pre-fetch request has been generated for the particular program instruction in a recent interval. Determining the pre-fetch degree based on the aforementioned count allows the pre-fetch logic 104 to generate a suitable number of pre-fetch requests for efficient operation of system 100. For example, if the count includes older pre-fetch requests, then the pre-fetch degree may be too high for efficient operation of the system 100. In one embodiment, the age of pre-fetch requests is measured in terms of clock cycles of the processor core 102. In one embodiment, any pre-fetch request made in the last 100 clock cycles is considered to be recent, and any pre-fetch request made over 100 clock cycles ago is considered to be not recent. Using 100 clock cycles is one example; however, recency of pre-fetch requests is not limited to this example. In one embodiment, a default pre-fetch degree is increased if the count over a recent interval is greater than a threshold, and decreased if the count over the recent interval is less than a threshold.

Another example of a statistic that may be tracked for a particular program instruction is a time that has elapsed since a stride confidence for a stride for the particular program instruction has been updated. In one embodiment, the pre-fetch degree for the particular program instruction is determined based on the elapsed time. Determining the pre-fetch degree based on the aforementioned elapsed time allows the stride confidence to be used more accurately to determine the pre-fetch degree. In one embodiment, a default pre-fetch degree is increased if the elapsed time is less than a threshold, and decreased if the elapsed time is greater than a threshold. Thus, determining the pre-fetch degree based on the aforementioned elapsed time allows the pre-fetch logic 104 to generate a suitable number of pre-fetch requests for efficient operation of system 100.

Another example of a statistic that may be tracked for a particular program instruction is a pre-fetch usefulness feedback (PUF) that is linked to a program counter that identifies the particular program instruction. In one embodiment, the pre-fetch degree for the particular program instruction is based on the PUF. Because the PUF is linked to the program counter that identifies the particular program instruction, the PUF is highly relevant to the particular program instruction. In one embodiment, a default pre-fetch degree is decreased if the PUF is less than a threshold, and increased if the PUF is greater than a threshold. Thus, determining the pre-fetch degree based on the PUF allows the pre-fetch logic 104 to generate a suitable number of pre-fetch requests for efficient operation of system 100.

Figure 2:
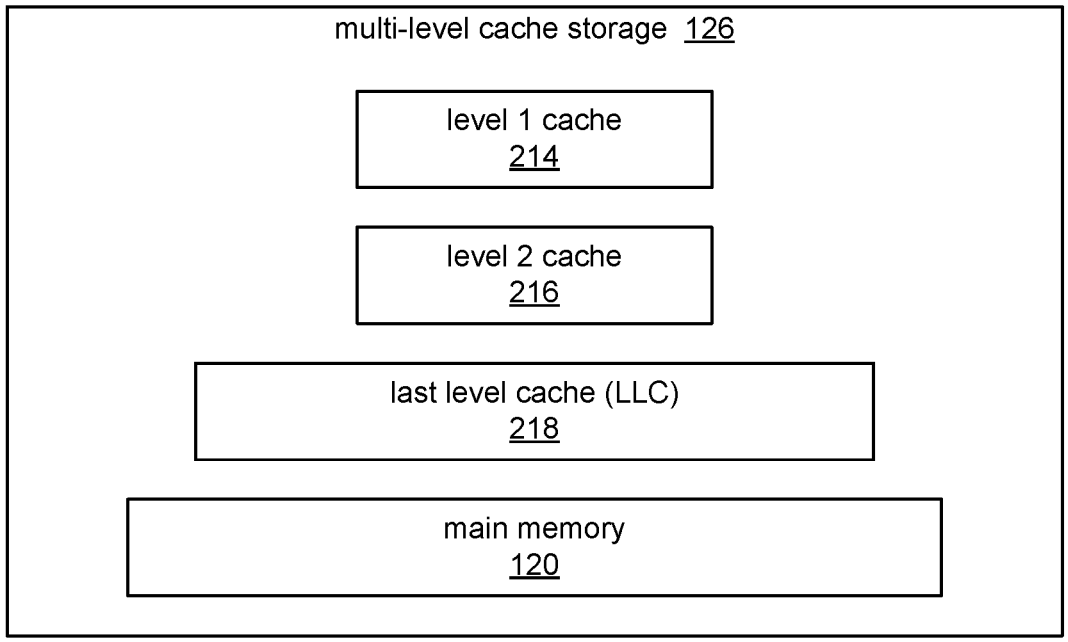
FIG. 2 depicts one embodiment of a multi-level cache storage.

FIG. 2 depicts one embodiment of multi-level cache storage 126. The multi-level cache storage 126 includes level 1 (L1) cache 214, level 2 (L2) cache 216, last level cache (LLC) 218, and main memory 120. There could be other levels of cache. For example, there could be an additional cache between the level 2 cache 216 and the LLC 218. In one embodiment, the L1 cache 214 is divided into an instruction cache for caching program instructions, and a data cache for caching program data.

In one embodiment, the level 1 cache 214 is on the same semiconductor die (e.g., chip) as the processor core 102. In one embodiment, both the level 1 cache 214 and the level 2 cache is on the same semiconductor die (e.g., chip) as the processor core 102. A cache that is on the same semiconductor die (e.g., chip) as the processor core 102 may be referred to as internal cache. Alternatively, the L2 cache 216 could be external to the semiconductor die that contains the processor core 102.

In one embodiment, the LLC 218 is an external cache, by which it is meant that the cache is external to the semiconductor die that contains the processor core 102. In one embodiment, the LLC 218 is implemented using eDRAM. There may be more than one external cache. For example, there could be a level 3 (L3) and a level 4 (L4) cache.

Some, or all, of the caches may be private caches, by which it is meant that the caches are only accessible by the processor core 102. In one embodiment, the L1 cache 214 is a private cache. In one embodiment, both the L1 cache 214 and the L2 cache 216 are private caches. The LLC 218 could in some cases be private cache. Alternatively, some, or all, of the caches may be shared caches, by which it is meant that the caches are shared by the processor core 102 and another processor core. For example, the LLC 218 could be a shared cache.

The cache controllers 140 depicted in FIG. 1 may contain separate cache controllers that are each configured to control different levels in the cache storage 126. For example, cache controllers 140 may include an L1 cache controller, an L2 cache controller, an LLC cache controller, and a main memory controller. Thus, the cache controllers 140 may contain separate cache controllers that are distributed across the multi-level cache storage 126. Portions of the memory controller 122 may be located on the same semiconductor die that contains the processor core 102, whereas other portions of the memory controller 122 may be external to the semiconductor die that contains the processor core 102. For example, the load store 130 unit may be located on the semiconductor die that contains the processor core 102, whereas an LLC cache controller might be external to the semiconductor die.

In one embodiment, a cache controller 140 generates a pre-fetch usefulness feedback (PUF). In an embodiment, the PUF indicates how useful it was to pre-fetch a particular memory block to a cache. For example, a cache controller 140 for the L1 cache 214 may be configured to count each time there is a processor demand for a particular memory block. The PUF could include this count. The PUF may be stored in metadata in a cache. In one embodiment, the PUF is provided to the pre-fetch logic 104.

Figure 3:
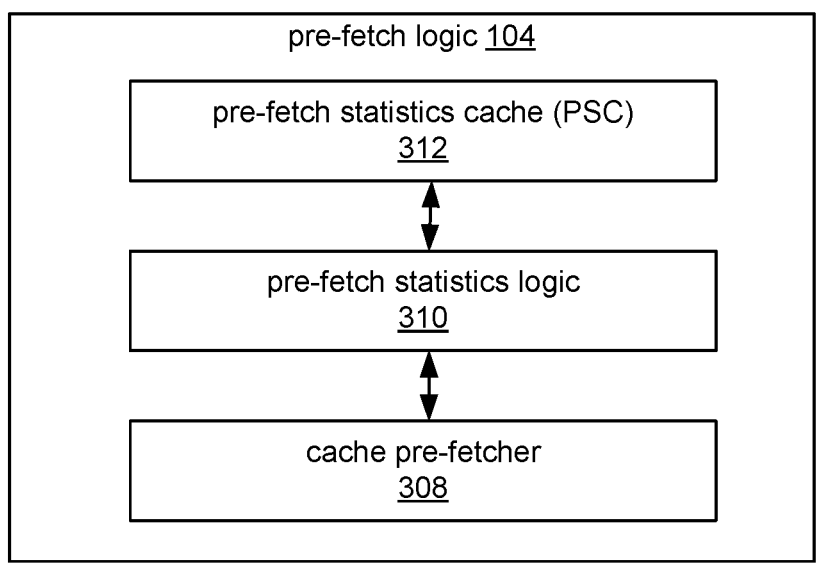
FIG. 3 depicts one embodiment of pre-fetch logic.

FIG. 3 depicts further details for one embodiment of the pre-fetch logic 104. The pre-fetch logic 104 includes a cache pre-fetcher 308, pre-fetch statistics logic 310, and a pre-fetch statistics cache (PSC) 312. In some embodiments, the cache pre-fetcher 308 and the pre-fetch statistics logic 310 are implemented with discrete logic. The discrete logic may include, but is not limited to, NAND gates and/or NOR gates.

The PSC 312 is used to store one or more statistics about cache pre-fetches. In one embodiment, the PSC 312 is organized into entries in which each entry links a value of a program counter to one or more statistics. In one embodiment, the PSC cache 312 is implemented in DRAM. In one embodiment, the PSC cache 312 is implemented in SRAM. In one embodiment, the PSC cache 312 includes a content addressable memory (CAM), which facilitates access to the PSC cache 312. In one embodiment, entries in the PSC 312 may be accessed by the value of a program counter. The pre-fetch statistics logic 310 is configured to track the one or more statistics and store the one or more statistics in the PSC 312.

The cache pre-fetcher 308 is configured to execute an algorithm to determine what (and how many) pre-fetch requests should be generated. In one embodiment, the cache pre-fetcher 308 comprises a hardware cache pre-fetcher. In one embodiment, the cache pre-fetcher 308 comprises a stride pre-fetcher. In some embodiments, the stride pre-fetcher is implemented in hardware (e.g., a hardware stride pre-fetcher). A stride pre-fetcher operates under the assumption that requests for memory blocks from the processor core 102 will tend to be to addresses that differ by a "stride". The stride pre-fetcher may determine the stride based on an analysis of memory addresses that are accessed. Hence, the stride may change over time. The stride can be positive or negative. In some embodiment, the stride has a pre-determined value. For example, the stride can have a value of one, which in some cases is referred to as a next line pre-fetcher. Hence, a next line pre-fetcher may be considered to be a type of stride pre-fetcher. In one embodiment, the pre-fetch logic 104 receives the PUF from the memory hierarchy 106. In one embodiment, the cache pre-fetcher 308 factors in the PUF when determining a pre-fetch degree.

Figure 4:
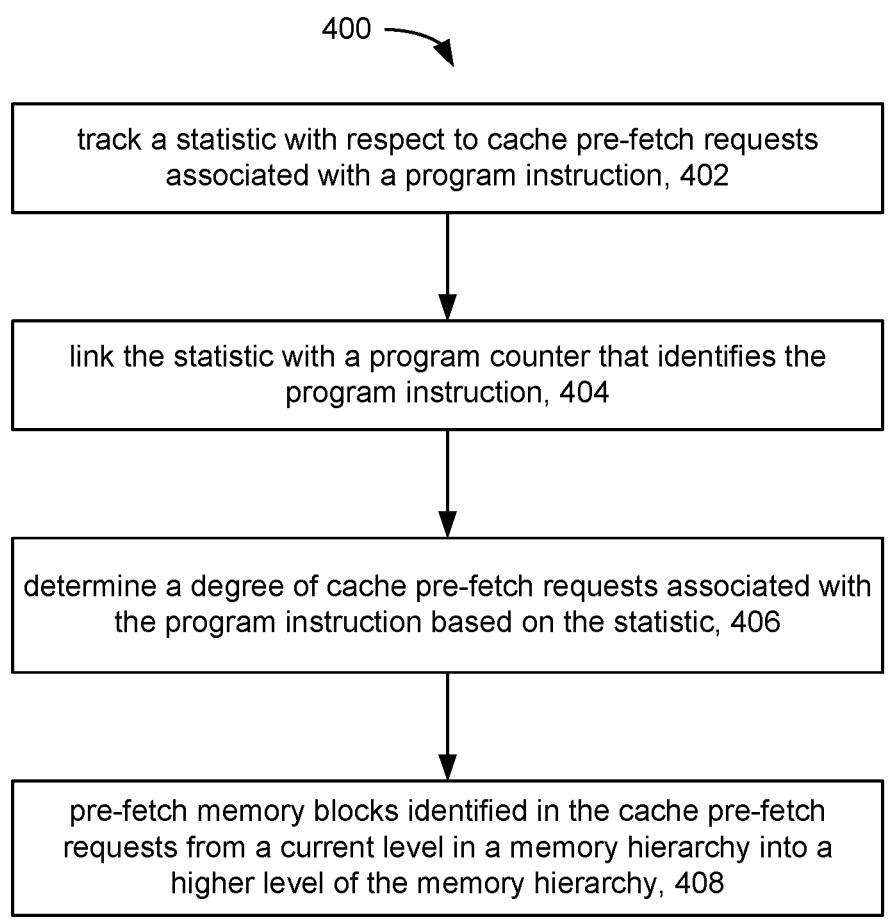
FIG. 4 depicts one embodiment of a process of pre-fetching data.

FIG. 4 depicts a flowchart of one embodiment of a process of pre-fetching memory blocks. In one embodiment, the process 400 may be performed in system 100. Reference will be made to system 100 when discussing process 400; however, process 400 is not limited to system 100. The steps in process 400 are depicted in a particular order as a matter of convenience, but do not necessarily occurred in the depicted order. Also, some or all of the steps may be repeated over time. In one embodiment, process 400 is performed in hardware.

Step 402 includes tracking a statistic with respect to cache pre-fetch requests associated with a program instruction. The program instruction is one that is executed by the processor core 102. The program instruction could be, for example, a load instruction. In one embodiment, the program instruction is identified by a program counter. In one embodiment, the pre-fetch statistics logic 310 stores the statistic in the PSC 312.

Step 404 includes linking the statistic with the program counter that identifies the program instruction. Thus, the statistic is highly relevant to the program instruction.

Step 406 includes determining a degree of cache pre-fetch requests associated with the program instruction based on the statistic. In one embodiment, the cache pre-fetcher 308 determines the pre-fetch request degree based on a statistic in the PSC 312. In one embodiment, the cache pre-fetcher 308 executes a base algorithm which determines an initial (or default) pre-fetch request degree, without factoring in the statistic. Then, the default pre-fetch request degree may be increased or decreased based on the statistic. Therefore, the statistics may be used to improve the accuracy of the default degree such that the system 100 operates more efficiently.

Step 408 includes pre-fetching memory blocks identified in the cache pre-fetch requests from a current level in the memory hierarchy 106. Each cache pre-fetch request identifies a memory block. The memory block may be identified by an address in the memory hierarchy 106. This address may be an address in the main memory 120, although the memory block may reside at a higher level in the memory hierarchy 106. The cache pre-fetch request may also identify the cache to which the memory block is to be pre-fetched.

For example, the memory controller 122 receives one or more pre-fetch requests from the pre-fetch logic 104. These pre-fetch requests are associated with a program instruction. For example, the pre-fetch logic 104 generated the one or more pre-fetch requests in response to detecting that the processor core 102 executed the program instruction. In response to receiving the one or more pre-fetch requests, the memory controller 122 executes the pre-fetch request. A pre-fetch request might or might not result in a memory block being pre-fetched to a higher level in the memory hierarchy 106, such as where the current level is the highest level in the memory hierarchy, for example.

Figure 5A:
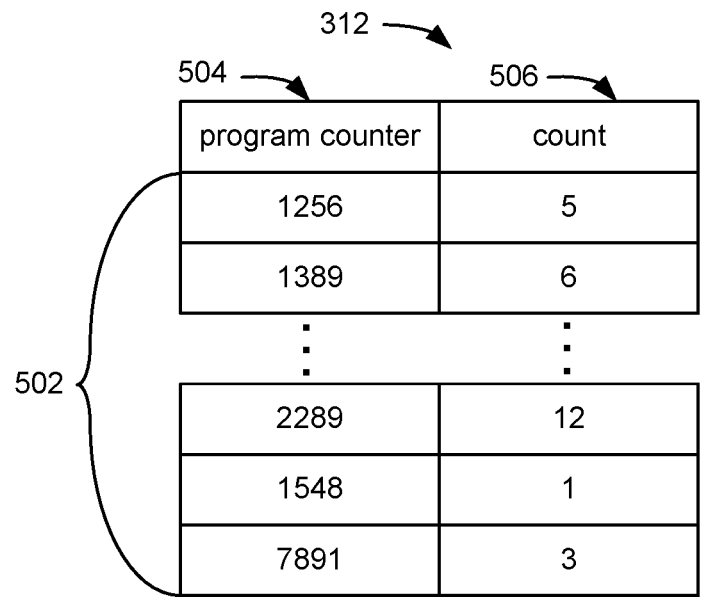

FIG. 5A depicts one embodiment of a PSC 312. The PSC 312 has a number of entries 502. Each entry 502 has a program counter field 504, which is used to store a value of the program counter that identifies a program instruction for the respective entry. The program instruction is one for which a cache pre-fetch request has been issued. The program instruction could be, for example, a load instruction. In one embodiment, the PSC 312 is content addressable memory (CAM), which is addressable by the value of the program counter. Hence, the program counter may be used to search for an entry 502 in the PSC 312.

Each entry 502 in PSC 312 has a count field 506 that contains a count that is used to track a statistic with respect to the cache pre-fetch requests for the program instruction for a respective entry. In one embodiment, the count is used to track a number of cache pre-fetch requests that are generated for the program instruction. Tracking the statistic for pre-fetches for a particular program instruction allows the statistic to be used to accurately determine a pre-fetch degree for the particular program instruction.

The PSC 312 has a limited size. For example, the PSC 312 may have 32 entries. Thus, the PSC 312 might be used to track statistics for up to 32 different program instructions. The PSC 312 could have more or fewer than 32 entries. In some embodiments, an entry could be removed from the PSC 312.

Figure 5B:
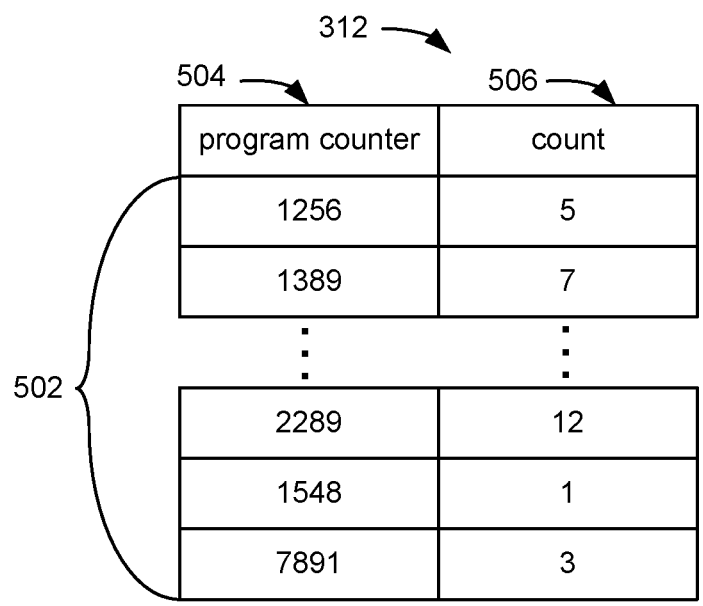
Figure 6A:
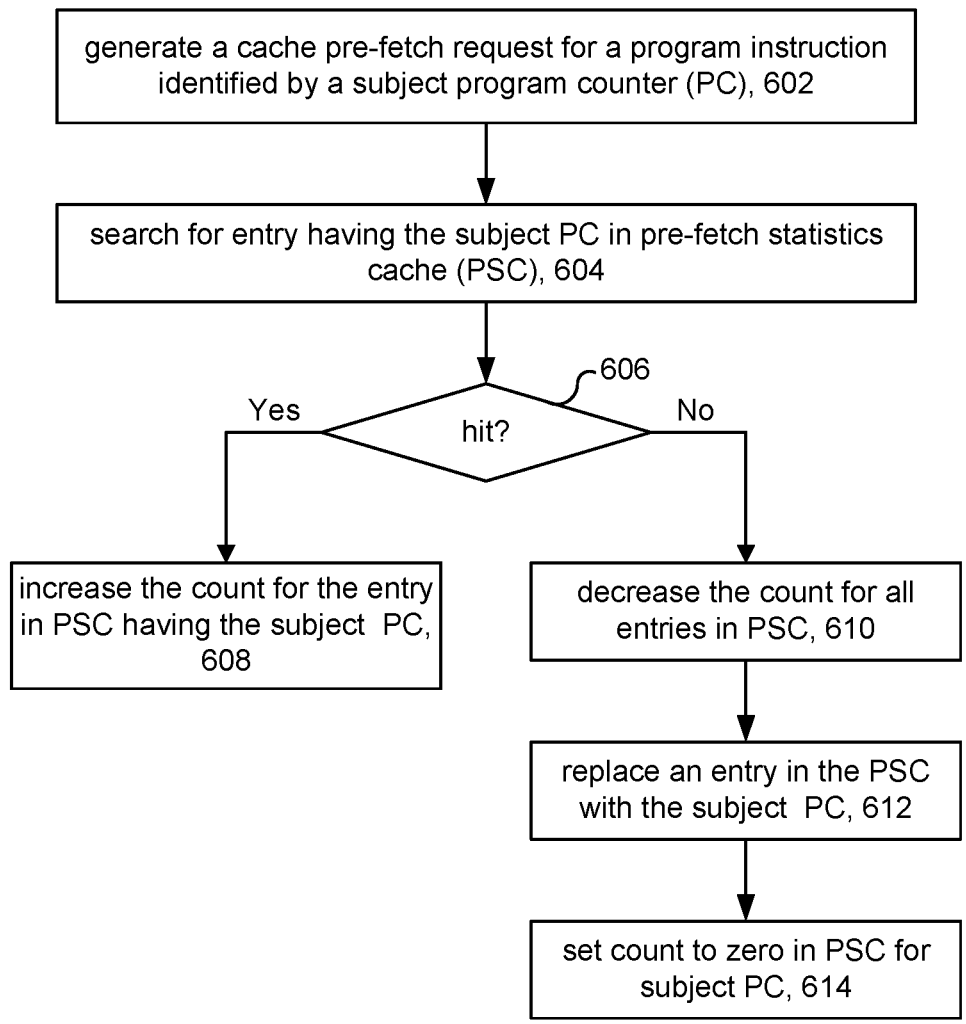
FIG. 6A depicts one embodiment of a process of updating a pre-fetch statistics cache.

FIG. 6A depicts a flowchart of one embodiment of a process 600 of updating a PSC 312. The process 600 may be used to update the PSC 312 depicted in FIG. 5A. FIGS. 5B-5D will be discussed in connection with FIG. 6A. In one embodiment, process 600 is performed in hardware.

Step 602 includes generating a cache pre-fetch request for a program instruction identified by a program counter (PC). For the sake of discussion, the program counter will be referred to as a "subject program counter" and the program instruction will be referred to as a "subject program instruction." Step 602 may be performed by the cache pre-fetcher 308.

Step 604 includes searching for an entry in the PSC 312 having the subject program counter. Two examples will be provided for illustration. In the first example, the subject program counter is already in the PSC 312. In the second example, the subject program counter is not already in the PSC 312.

Step 606 is a determination of whether the subject program counter was found in the PSC 312. Finding the subject program counter may be referred to as a hit. If the subject program counter is found in the PSC 312 (step 606 is yes), then control passes to step 608. Step 608 includes increasing the count for the entry in the PSC 312 having the subject program counter. For the sake of illustration, the subject program counter is 1389. With reference to FIG. 5A, the subject program counter is already in the PSC 312, and presently has a count of 6. With reference to FIG. 5B, the count for the entry having PC=1389 has been incremented from 6 to 7. In one embodiment, none of the other entries 502 in the PSC 312 are altered in step 608. Process 600 then concludes.

If the subject program counter is not found in the PSC 312 (step 606 is no), then control passes to step 610. Step 610 includes decreasing the count for all entries in the PSC 312. In one embodiment, the count is allowed to go negative. In one embodiment, the count is not decremented below a certain value, such as zero. Step 612 includes replacing an entry in the PSC 312 with an entry for the subject program counter. The entry that is replaced (or removed) is referred to as a victim entry. In one embodiment, the victim entry is the entry having the lowest count. If more than one entry has the same count, any tie breaking procedure may be used to select the victim entry. In one embodiment, the victim is selected randomly when there is a tie. In one embodiment, the lowest possible count is zero, in which case the first entry that is found with a zero count may be removed, which is very efficient. Step 614 includes setting the count in the PSC 312 for the subject program counter to zero. Process 600 then concludes.

For the sake of illustration of an embodiment of steps 610-614, the subject program counter in a second example is 3346 and is not found in the PSC 312 (with reference again to FIG. 5A). Hence, the PSC 312 does not presently contain an entry 502 for the program instruction identified by the subject program counter. With reference to FIG. 5C, the count for all entries 502 in the PSC 312 has been decremented by one relative to FIG. 5A. With reference to FIG. 5D (relative to FIG. 5C), the entry 502 for PC=1548 has been replaced with an entry 502 for PC=3346. Also, the count for the entry 502 for PC=3346 is set to zero. In another embodiment, this initial count could be set to another value such as one.

The statistic in the PSC 312 in FIGS. 5A-5D may be used to determine a degree of cache pre-fetch requests for program instructions. For example, the count for a program instruction that is identified by the program counter may be used, at least in part, to determine a pre-fetch degree for the program instruction.

Figure 6B:
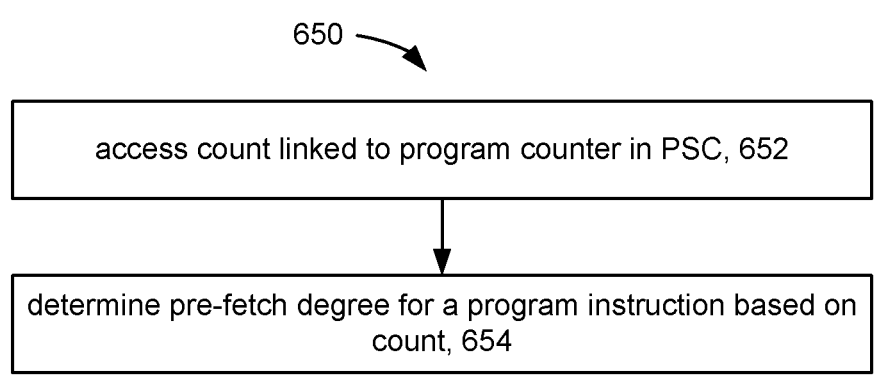
FIG. 6B depicts one embodiment of a process of determining a pre-fetch degree for a particular program instruction based on a count of pre-fetch requests for the particular program instruction.

FIG. 6B depicts one embodiment of a process 650 of determining a pre-fetch degree for a particular program instruction based on a count of pre-fetch requests for the particular program instruction. Process 650 may be used in combination with process 600, with process 600 being used to track the count. Process 650 may be initiated when the pre-fetch logic 104 determines that it is going to determine a pre-fetch degree for a program instruction that is identified by a program counter.

Step 652 includes accessing a count to reach a stride confidence for a stride for a program instruction. In one embodiment, the program counter that identifies the program instruction is used to look for an entry 502 in the PSC 312 in one of FIG. 5A-5D. The count may be accessed from count field 506.

Step 654 includes determining a pre-fetch degree for the program instruction based on the count. In one embodiment, a default pre-fetch degree is first determined without regard to the count. Then, the default pre-fetch degree may be altered based on the count. For example, if the count is less than a threshold, then the default pre-fetch degree may be decreased. As one example, the default pre-fetch degree may be decreased by one if the elapsed time is less than the threshold. However, the default pre-fetch degree may be decreased by more than one.

On the other hand, if the count is greater than the threshold, then the default pre-fetch degree may be increased. As a simple example, the default pre-fetch degree may be increased by one if the count is greater than the threshold. However, the default pre-fetch degree may be increased by more than one.

There could be more than one threshold which can allow for the default degree to change by a different amount for different thresholds. For example, if the count is less than threshold A, then the default pre-fetch degree might be decreased by one. If the count is greater than threshold A but less than threshold B, then the default pre-fetch degree might be unaltered. If the count is between threshold B and threshold C, then the default pre-fetch degree might be increased by one. If the count is greater than threshold C, then the default pre-fetch degree might be increased by two.

In some embodiments, the cache pre-fetcher 308 is configured as a stride pre-fetcher. FIG. 7 depicts one embodiment of a PSC 312 that may be used in connection with stride pre-fetching. The PSC 312 in FIG. 7 has a number of entries 702. Each entry 702 has a program counter field 704 and a count field 706, which may be used in a similar manner as the PSC 312 in FIGS. 5A-5D. In some embodiments, the number of entries 502 in the tables 312 in FIGS. 5A-5D may be much smaller than the number of entries 702 in the FIG. 7.

The PSC 312 in FIG. 7 has some additional columns that are used for a stride field 708 and a stride confidence field 710. The cache pre-fetcher 308 determines a stride for the program instruction. From time to time the stride may be updated. The cache pre-fetcher 308 also determines a confidence in that stride, which is stored as stride confidence 710. Stride confidence field 710 stores the current stride confidence. In one embodiment, the stride confidence is incremented if the stride for the program counter repeats. In one embodiment, pre-fetches start to be generated when the stride confidence reaches a threshold. In one embodiment, the cache pre-fetcher 308 determines the pre-fetch degree at least in part on the stride confidence 710. For example, the cache pre-fetcher 308 may increase the degree if the stride confidence 710 is high, or decrease the degree if the stride confidence 710 is low.

Tracking a count of the pre-fetch requests for a program instruction is not the only technique that can be used to track a statistic with respect to the cache pre-fetch requests. In one embodiment, the PSC 312 is used to track an elapsed time since a change in stride confidence. The elapsed time since a change in stride confidence may be used, at least in part, to determine a pre-fetch degree. Determining the pre-fetch degree based on the elapsed time since a change in stride confidence helps to improve efficiency of the pre-fetches. For example, if the elapsed time since a change in stride confidence is high, the pre-fetch degree might be decreased which can avoid generating too many pre-fetches for efficient operation of system 100. On the other hand, if the elapsed time since a change in stride confidence is low, the pre-fetch degree might be increased which can result in generating enough pre-fetches for efficient operation of system 100.

FIG. 8 depicts one embodiment of a PSC 312 that stores elapsed time since a change in stride confidence. The PSC 312 in FIG. 8 is one embodiment of the PSC 312 in system 100. The PSC 312 in FIG. 8 has entries 802, which each pertain to one program instruction. The program counter field 804 stores the value of the program counter that identifies the program instruction. The stride field 806 stores the stride for the program instruction. In one embodiment, the cache pre-fetcher 308 determines the stride, and may change the stride. The stride confidence field 808 stores the stride confidence for the program instruction. In one embodiment, the cache pre-fetcher 308 determines an initial confidence for the stride at the time the stride is first determined. The cache pre-fetcher 308 may occasionally update the stride confidence.

Figure 9A:
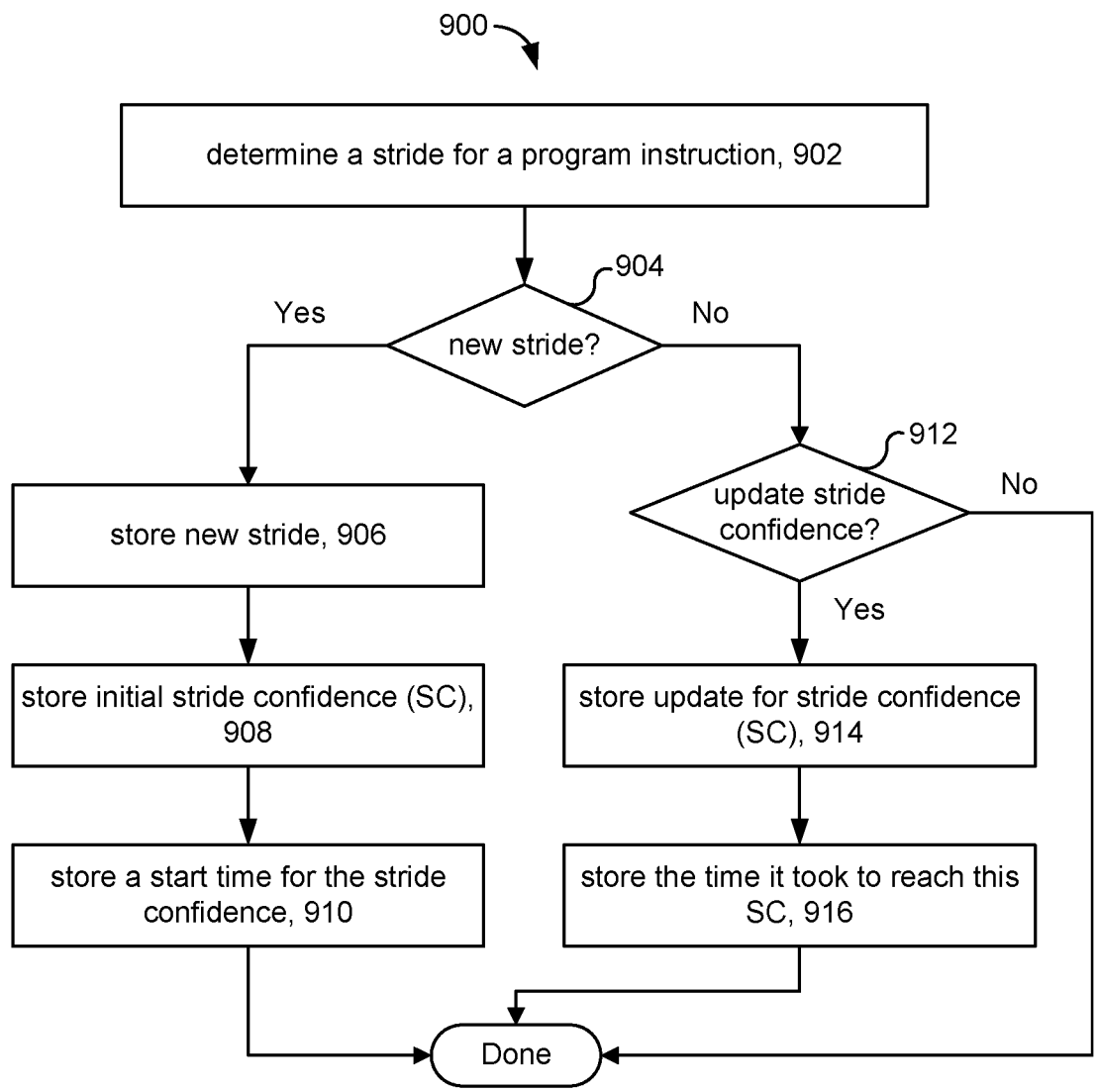
FIG. 9A depicts one embodiment of a process of updating a pre-fetch statistics cache elapsed time since a change in stride confidence.

The start time field 810 stores a time at which the stride was first determined. If the stride is set to a new value, the start time may be reset to the present time. In the example in FIG. 8, the start time is expressed as what may be referred to as a "wall clock", which contains a date (day/month/year) and a time (hour: minute: second). The elapsed time field 812 stores a time that has elapsed since the stride confidence was last updated. In the example in FIG. 8, the elapsed time is expressed in the format (hours: minutes: seconds). The start time and the elapsed time may be expressed in any suitable manner. In another embodiment, both the start time and the elapsed time are expressed as a number of clock cycles. The clock could be a clock of processor clock cycles, or another clock in the system 100. The elapsed time is one example of a statistic with respect to cache pre-fetch requests for a program instruction identified by a program counter FIG. 9A depicts one embodiment of a process 900 of updating a PSC 312 that tracks elapsed time since a change in stride confidence. In one embodiment, process 900 is performed by pre-fetch logic 104 to track statistics in the PSC 312. In one embodiment, process 900 is performed in hardware.

Step 902 includes determining a stride for a program instruction. In an embodiment, the program instruction is identified by a program counter. Numerous techniques are known to those of ordinary skill for determining a stride for a program instruction.

Step 904 includes a determination of whether this is a new stride for the program instruction. The cache pre-fetcher 308 may examine the PSC 312 in FIG. 8 to determine whether this is a new stride for the program instruction (based on the program counter). If the stride is new (step 904 is yes), then control passes to step 906.

Step 906 includes storing the new stride. For example, the stride is stored in stride field 806 for the appropriate entry 802 in the PSC 312 in FIG. 8. If there is not an entry having the program counter for the program instruction, then a new entry may be created. Creating a new entry could result in another entry being evicted. Eviction can be performed based on one or more criteria. For example, an entry having the lowest stride confidence could be evicted. As another example, an entry having the longest elapsed time since the stride confidence was updated could be evicted.

Step 908 includes storing an initial stride confidence. For example, the stride confidence is stored in stride confidence field 808 for the appropriate entry 802 in the PSC 312 in FIG. 8. The stride confidence may be determined in variety of ways.

Step 910 includes storing a start time in for the stride confidence. For example, a current time is stored in start time field 810 for the appropriate entry 802 in the PSC 312 in FIG. 8. The current time could be a current wall clock time. The current time could be expressed in another manner, such as a number of clock cycles relative to some starting point. The process 900 then concludes.

If the stride is not new (step 904 is no), then control passes to step 912. Step 912 includes a determination of whether the stride confidence is to be updated. By update, it is meant that a different value is to be used for the stride confidence. In the stride confidence is not to be updated, then process 900 concludes. In the stride confidence is to be updated, then control passes to step 914. Step 914 includes storing an update for the stride confidence. For example, the new value for the stride confidence is stored in stride confidence field 808 for the appropriate entry 802 in the PSC 312 in FIG. 8. Step 916 includes storing the time it took to reach this stride confidence. For example, the time is stored in the elapsed time field 812 for the appropriate entry 802 in the PSC 312 in FIG. 8. The elapsed time may be determined based on the difference between the present time and the time in the start time field 810 for the appropriate entry 802. The process 900 then concludes.

The statistic in the PSC 312 in FIG. 8 may be used to determine a degree of cache pre-fetch requests for program instructions. For example, the elapsed time since the stride confidence for a stride for a program instruction was last updated may be used, at least in part, to determine a pre-fetch degree for the program instruction.

Figure 9B:
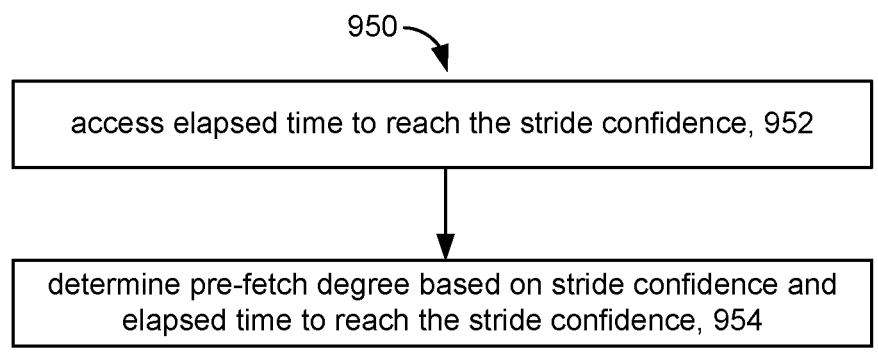
FIG. 9B depicts one embodiment of a determining a pre-fetch degree based on an elapsed time since a change in stride confidence.

FIG. 9B is a flowchart that depicts one embodiment of a process 950 of determining a pre-fetch degree for a program instruction based on an elapsed time since a stride confidence for a stride for a program instruction was last updated. Process 950 may be used in combination with process 900, with process 900 being used to track the elapsed time. Reference will be made to the PSC 312 in FIG. 8 to discuss process 950.

Step 952 includes accessing an elapsed time to reach a stride confidence for a stride for a program instruction. In one embodiment, the program counter that identifies the program instruction is used to search for an entry 802 in the PSC 312 in FIG. 8. The elapsed time may be accessed from elapsed time field 812.

Step 954 includes determining a pre-fetch degree for the program instruction based on the stride confidence and the elapsed time to reach the stride confidence. In some embodiments, the pre-fetch degree is inversely proportional to the elapsed time. In one embodiment, a default pre-fetch degree is first determined without regard to the elapsed time. Then, the default pre-fetch degree may be altered based on the elapsed time. For example, if the elapsed time is less than a first threshold, then the default pre-fetch degree may be increased. As one example, a default pre-fetch degree may be increased by one if the elapsed time is less than the first threshold. However, the pre-default fetch degree may be increased by more than one if the elapsed time is less than the first threshold.

On the other hand, if the elapsed time is greater than a second threshold, then the default pre-fetch degree may be decreased. As a simple example, the default pre-fetch degree may be decreased by one if the elapsed time is greater than the second threshold. However, the default pre-fetch degree may be decreased by more than one if the elapsed time is greater than the second threshold.

There could be more than two thresholds, which can allow for the default degree to change by a different amount for different thresholds. For example, if the elapsed time is less than threshold A, then the default pre-fetch degree may be increased by two. If the elapsed time is less than threshold B but not less than threshold A, then the default pre-fetch degree may be increased by one. On the other hand, if the elapsed time is greater than threshold C but not greater than threshold D, then the default pre-fetch degree may be decreased by one. If the elapsed time is greater than threshold D, then the default pre-fetch degree may be decreased by two.

The thresholds may be expressed in a suitable manner depending on how the elapsed time is expressed. For example, the threshold could be expressed as a number of seconds or a number of clock cycles, depending on how the elapsed time is expressed. The first and second threshold could be the same or different.

Figures 10, 11:
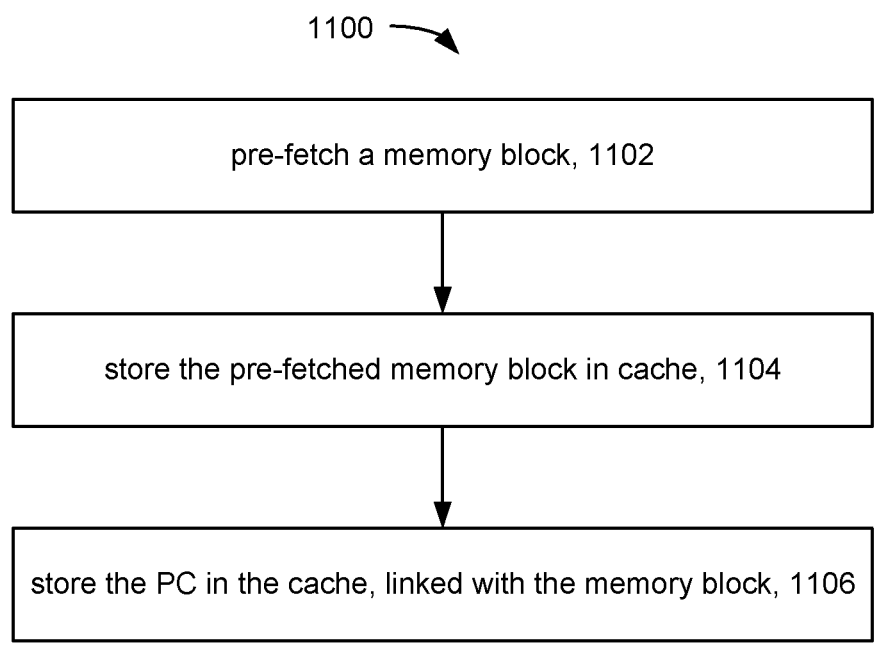
FIG. 10 depicts one embodiment of metadata that tracks usefulness of a memory block pre-fetch in a cache memory.
FIG. 11 depicts one embodiment of a process of storing a program counter in metadata that tracks usefulness of a memory block pre-fetch.

FIG. 10 depicts one embodiment of metadata in a cache memory 1000. The metadata that tracks usefulness of a memory block pre-fetch. In one embodiment, the cache memory 1000 resides in L1 cache 214. In one embodiment, the cache memory 1000 resides in L2 cache 216. The cache memory 1000 could reside elsewhere than L1 cache 214 or L2 cache 216. The cache memory 1000 includes a number of cache entries 1002. Each cache entry has a memory block 1010, which might or might not have been pre-fetched. A pre-fetched flag 1008 indicates whether or not the memory block 1010 was pre-fetched. In this example, a "1" indicates that the memory block was pre-fetched. The pre-fetch usefulness feedback (PUF) field 1006 indicates how useful the pre-fetch was. In one embodiment, the PUF is a counter that is incremented each time that the processor core 102 issues a demand for the pre-fetched memory block. In one embodiment, if a pre-fetched block is evicted without a processor demand, then the PUF field 1006 could be set to, for example, −1 to indicate that the pre-fetched block was not demanded. The program counter field 1004 contains a program counter that identifies the program instruction for which the pre-fetch request resulted in pre-fetching the memory block. Thus, some entries will have a program counter, but some entries might not have a program counter.

FIG. 11 depicts one embodiment of a process 1100 of storing a program counter in metadata in a cache memory that tracks usefulness of a memory block pre-fetch. The process 1100 will be described with reference to the cache memory 1000 in FIG. 10. In step 1102, a memory block is pre-fetched. The memory block may be pre-fetched in response to a pre-fetch request from pre-fetch logic 104. The pre-fetch request is associated with a program instruction that is identified by a program counter.

Step 1104 includes storing the pre-fetched memory block in cache memory. For example, the memory block is stored in one of the entries 1002 in cache memory 1000. In one embodiment, the pre-fetched flag 1008 is set to 1 to indicate that this memory block was pre-fetched.

Step 1106 includes storing the program counter linked with the memory block. The program counter refers to the program counter that identifies the program instruction associated with the pre-fetch request. With reference to FIG. 10, the program counter may be stored in the entry 1002 that has the pre-fetched memory block.

Figure 12:
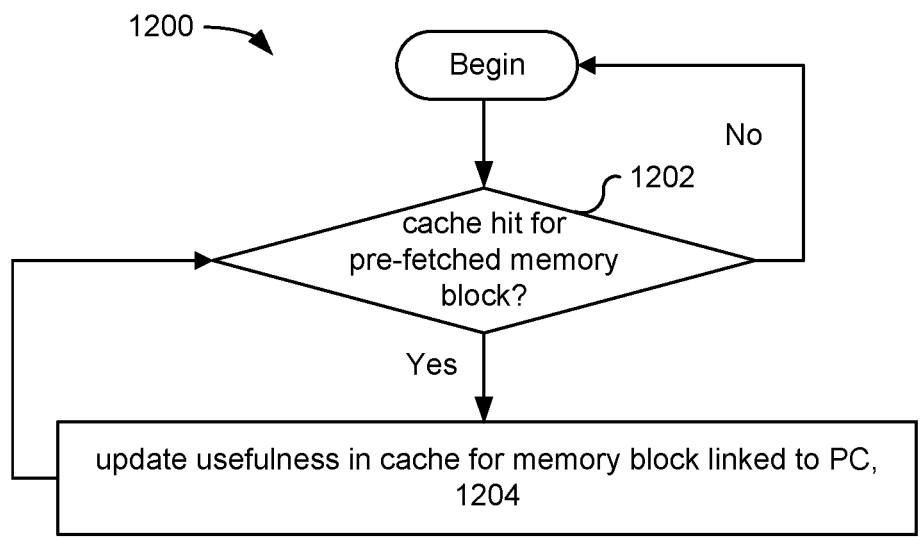
FIG. 12 depicts one embodiment of a process of updating usefulness of a memory block pre-fetch that is linked to a program counter.

FIG. 12 depicts one embodiment of a process 1200 of updating a PUF of a memory block pre-fetch. The memory block is linked with a program counter, such that the PUF is linked with the program counter. This allows the PUF to be linked with the program instruction that caused the pre-fetch. This is in contrast to linking the PUF only with the memory block. If the PUF is linked with the memory block, but not with a program instruction that caused the pre-fetch, then it may not be evident whether the pre-fetch is truly useful for a particular program instruction. For example, the pre-fetch of a memory block might be useful for one program instruction but not for another.

Step 1202 includes a determination of whether there is a cache hit for a pre-fetched memory block. If not, no action is taken. If there is a cache hit, then step 1204 is performed. In step 1204, the pre-fetch usefulness feedback (PUF) for the memory block is updated. In one embodiment, the PUF is incremented by one. The PUF may also be used to track bad pre-fetches. For example, if the pre-fetched memory block is never demanded before it is evicted, then the PUF can be set to −1, for example. In one embodiment, feedback of a "bad pre-fetch" may be used to decrease the pre-fetch degree.

Other variations of process 1200 are contemplated and are within the scope of the description and claims. In one embodiment, the PUF is only incremented once. After a cache hit, the pre-fetched flag (FIG. 10, 1008) may be set to zero, such that future cache hits do not affect the PUF. Thus, in effect, after a cache hit, the pre-fetched memory block is no longer treated as a pre-fetched memory block.

Figure 13:
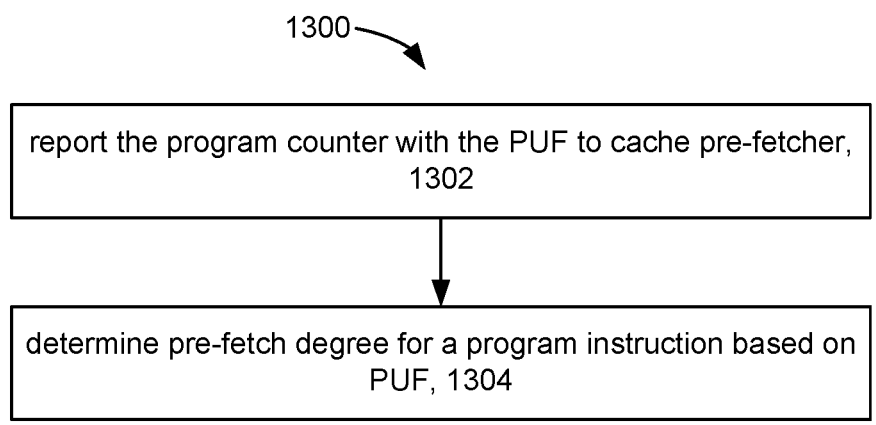
FIG. 13 depicts one embodiment of a process of determining a pre-fetch degree based on memory block pre-fetch usefulness information linked to a program counter.

FIG. 13 depicts one embodiment of a process 1300 of determining a pre-fetch degree based on a PUF linked to a program counter that identifies a program instruction. Process 1300 may be used in combination with process 1100 and/or 1200, but is not limited to use with process 1100 and/or 1200. In one embodiment, process 1200 is performed in hardware.

Step 1302 includes reporting the program counter with the PUF to pre-fetch logic 104. Step 1302 may include reporting the PUF for a specific program counter, or reporting the PUF for multiple program counters. For example, with respect to the cache memory 1000 in FIG. 10, the value in the program counter field 1004 and the value in the PUF field 1006 may be reported for one or more entries 1002.

Figure 14:
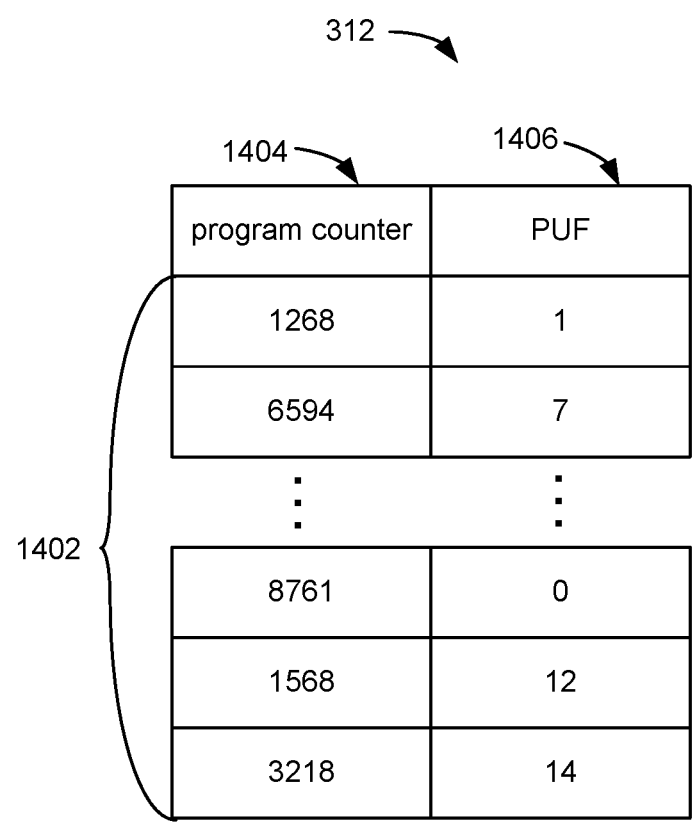
FIG. 14 depicts one embodiment of a pre-fetch statistics cache that links a program counter to memory block pre-fetch usefulness information.

In one embodiment, the pre-fetch logic 104 updates the PSC 312 based on the PUF and program counter. FIG. 14 depicts one embodiment of a PSC 312 that may be updated in process 1300. The PSC 312 in FIG. 14 is one embodiment of PSC 312 in system 100. The PSC 312 in FIG. 14 has a number of entries 1402. Each entry 1402 contains a program counter field 1404 and a PUF field 1406. In one embodiment, rather than having a separate PSC 312 in addition to the metadata in the cache memory 1000, the metadata in the cache memory 1000 may be used as the PSC 312. For example, the program counter field 1004 and the PUF field 1006 in the cache memory 1000 may serve as the PSC 312, in one embodiment.

Step 1304 includes determining a pre-fetch degree for a program instruction based on the PUF for the program counter that identifies the program instruction. In one embodiment, the cache pre-fetcher 308 executes an algorithm that determines the pre-fetch degree at least in part on the PUF. In one embodiment, a higher PUF corresponds to a higher pre-fetch degree. In one embodiment, the cache pre-fetcher 308 executes an algorithm that determines the pre-fetch degree based on the PUF and a stride confidence. Again, a higher PUF may correspond to a higher pre-fetch degree. In some embodiments, the PUF that was received in step 1302 is increased in step 1304 because the PUF is linked to a program counter that identifies the program instruction. This increase to the PUF may have the effect of increasing the pre-fetch degree for the program instruction.

Figure 15:
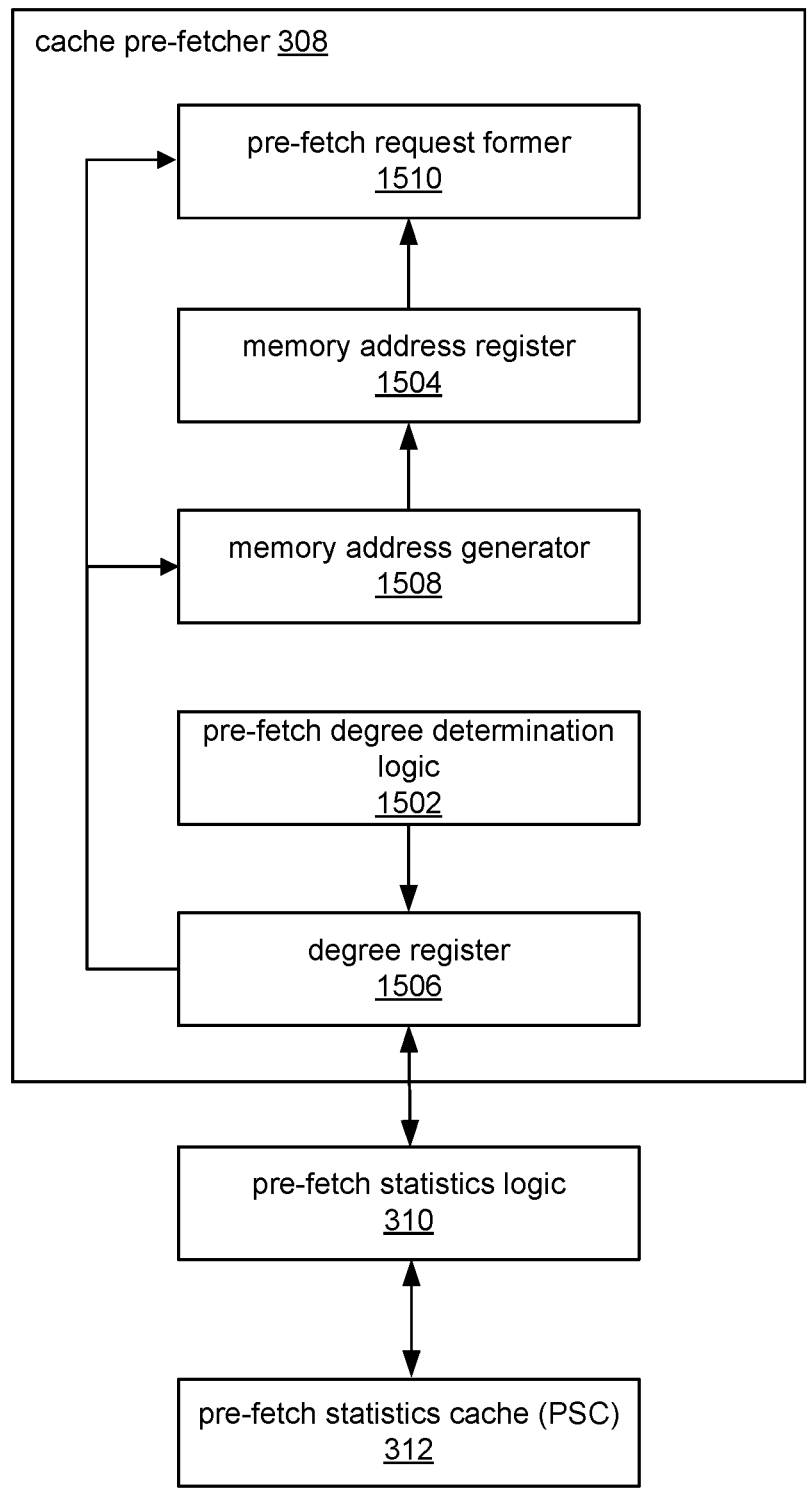
FIG. 15 depicts one embodiment of registers and other logic in a pre-fetch logic.

FIG. 15 depicts one embodiment of pre-fetch logic 104. The cache pre-fetcher 308 has pre-fetch determination logic 1502, an address register 1504, a degree register 1506, a memory address generator 1508, and a pre-fetch request former 1510. The pre-fetch determination logic 1502 is configured to determine an initial (or default) pre-fetch degree. In one embodiment, the default degree is not based on statistics in the PSC 312. The pre-fetch statistics logic 310 is configured to adjust the default degree based on the statistics in the PSC 312.

The memory address generator 1508 is configured to generate a memory address for each pre-fetch request. In one embodiment, the cache pre-fetcher 308 has a stride register, which contains a stride determined by the cache pre-fetcher 308. In one embodiment, the memory address generator 1508 determines an initial memory address for the first cache pre-fetch for a program instruction, and stores the initial memory address in the memory address register 1504. The pre-fetch request former 1510 is configured to form pre-fetch requests, which each include a memory address. The memory address generator 1508 may increment the value in the memory address register 1504 by the stride (or some other value) for each additional pre-fetch request that is needed per the value in the degree register 1506.

Alternatives to the pre-fetch logic 104 are contemplated and are within the scope of the description and claims. In one embodiment, the pre-fetch determination logic 1502 accesses the PSC 312 and makes its determination of the pre-fetch degree based on the statistics in the PSC 312. Hence, it is not required for the pre-fetch statistics logic 310 to alter an initial pre-fetch degree that is determined by the pre-fetch determination logic 1502.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous details are set forth in order to provide a thorough understanding of the present subject matter. However, it will be clear to those of ordinary skill in the art that the present subject matter may be practiced without such details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the features or acts described above. Rather, the features and acts described above are disclosed as example forms of implementing the claims.

What is claimed is:

1. An apparatus for pre-fetching data, the apparatus comprising:
   a processor core;
   pre-fetch logic circuit in communication with the processor core, the pre-fetch logic circuit being configured to:
      generate cache pre-fetch requests for a program instruction identified by a program counter;
      track one or more statistics with respect to the cache pre-fetch requests, including track a count of the cache pre-fetch requests that are generated for the program instruction over a recent interval, the one or more statistics including the count;
      link the one or more statistics with the program counter; and
      determine a pre-fetch degree of the cache pre-fetch requests for the program instruction based on the one or more statistics; and
   a memory hierarchy in communication with the processor core and the pre-fetch logic circuit, the memory hierarchy comprising:
      a main memory;
      a hierarchy of caches; and
      a memory controller configured to pre-fetch memory blocks identified in the cache pre-fetch requests, the memory blocks being pre-fetched from a current level in the memory hierarchy into a higher level of the memory hierarchy.

2. The apparatus of claim 1 wherein the pre-fetch logic circuit is further configured to:
   adjust the pre-fetch degree of the cache pre-fetch requests for the program instruction based on the count of the cache pre-fetch requests that are generated for the program instruction over the recent interval.

3. The apparatus of claim 1 the pre-fetch logic circuit further comprising:
   a pre-fetch statistics cache configured to store the program counter that identifies the program instruction linked with the count of the cache pre-fetch requests that are generated for the program instruction over the recent interval in the pre-fetch statistics cache.

4. The apparatus of claim 3, wherein the pre-fetch logic circuit is further configured to:
   increment the count that is linked with the program counter in the pre-fetch statistics cache in response to a cache pre-fetch request being generated for the program instruction identified by the program counter; and
   decrement the count that is linked with the program counter in the pre-fetch statistics cache in response to a cache pre-fetch request being generated for the program instruction identified by program counter that is not in the pre-fetch statistics cache.

5. The apparatus of claim 3, wherein the pre-fetch logic circuit is further configured to:
   add an entry to the pre-fetch statistics cache in response to the cache pre-fetch request being generated for the program instruction identified by the program counter that is not in the pre-fetch statistics cache; and
   replace an entry in the pre-fetch statistics cache in response to the cache pre-fetch request being generated for the program instruction identified by the program counter that is not in the pre-fetch statistics cache.

6. The apparatus of claim 1, wherein the pre-fetch logic circuit is further configured to:
   determine a stride confidence for a stride for the program instruction identified by the program counter; and
   generate the cache pre-fetch requests based on the stride confidence.

7. The apparatus of claim 1 wherein the pre-fetch logic circuit is further configured to:
   track an elapsed time for a stride for the program instruction identified by the program counter to reach a current stride confidence, wherein the one or more statistics comprise the elapsed time; and
   determine the pre-fetch degree of the cache pre-fetch requests for the program instruction identified by the program counter based on the elapsed time and the current stride confidence.

8. The apparatus of claim 7, the pre-fetch logic circuit further comprising a pre-fetch statistics cache, wherein the pre-fetch logic circuit is configured to:
   store the program counter identified by the program instruction linked to the elapsed time for the stride to reach the current stride confidence in the pre-fetch statistics cache.

9. The apparatus of claim 7, wherein the pre-fetch logic circuit is further configured to:
   store a start time in the pre-fetch statistics cache in response to a new stride being determined for the program instruction identified by the program counter; and
   store the elapsed time in the pre-fetch statistics cache in response to a change in the stride confidence for the program instruction identified by the program counter.

10. The apparatus of claim 1, wherein the pre-fetch logic circuit is further configured to:
    store the program counter in association with a memory block that is pre-fetched into a cache at the higher level of the memory hierarchy in response to one of the cache pre-fetch requests;
    track a pre-fetch usefulness feedback that indicates whether the memory block in the cache at the higher level of the memory hierarchy is demanded by a processor, wherein the one or more statistics comprise the pre-fetch usefulness feedback;
    associate the program counter with the pre-fetch usefulness feedback; and
    determine the pre-fetch degree of the cache pre-fetch requests for the program instruction identified by the program counter based on the pre-fetch usefulness feedback associated with the program counter.

11. The apparatus of claim 1, wherein the pre-fetch logic circuit comprises a hardware cache pre-fetcher.

12. The apparatus of claim 1, wherein the pre-fetch logic circuit comprises a stride pre-fetcher.

13. A method of performing cache pre-fetches, the method comprising:
    tracking one or more statistics with respect to cache pre-fetch requests for a program instruction identified by a program counter, including tracking a count of the cache pre-fetch requests that are generated for the program instruction over a recent interval;
    linking the one or more statistics with the program counter;
    generating cache pre-fetch requests for the program instruction identified by the program counter, including determining a pre-fetch degree of the cache pre-fetch requests associated with the program instruction based on the one or more statistics; and pre-fetching memory blocks identified in the cache pre-fetch requests, the memory blocks being pre-fetched from a current level in a memory hierarchy into a higher level of the memory hierarchy.

14. The method of claim 13, wherein determining the pre-fetch degree of the cache pre-fetch requests associated with the program instruction based on the one or more statistics comprises:

adjusting the pre-fetch degree of the cache pre-fetch requests for the program instruction based on the count of the cache pre-fetch requests that are generated for the program instruction over the recent interval.

15. The method of claim 13, wherein tracking the one or more statistics and linking the one or more statistics with the program counter comprises:

storing the count of the cache pre-fetch requests that are generated for the program instruction over the recent interval in a pre-fetch statistics cache; and storing the program counter that identifies the program instruction in the pre-fetch statistics cache with the program counter linked with the count.

16. The method of claim 15, wherein tracking the one or more statistics comprises:

incrementing the count that is linked with the program counter in the pre-fetch statistics cache in response to determining that a cache pre-fetch should be performed for the program instruction identified by the program counter; and decrementing the count that is linked with the program counter in the pre-fetch statistics cache in response to generating a cache pre-fetch for the program instruction identified by a program counter that is not in the pre-fetch statistics cache.

17. The method of claim 13, wherein tracking the one or more statistics comprises:

determining a stride confidence for a stride for the program instruction; and tracking an elapsed time for the stride for the program instruction to reach the stride confidence.

18. A computer system, comprising:

a processor configured to execute program instructions, wherein each program instruction is identified by a corresponding program counter;

a cache pre-fetcher in communication with the processor, the cache pre-fetcher configured to generate cache pre-fetch requests for a program instruction identified by a program counter, the cache pre-fetch requests having a pre-fetch degree;

a memory hierarchy in communication with the processor, the memory hierarchy comprising a main memory, a hierarchy of caches, and a memory controller configured to pre-fetch memory blocks identified in the cache pre-fetch requests, the memory blocks being pre-fetched from a current level in the memory hierarchy into a higher level of the memory hierarchy;

pre-fetch statistics logic circuit in communication with the processor, the pre-fetch statistics logic configured to:

track the one or more statistics with respect to the cache pre-fetch requests for the program instruction, including track an elapsed time for a stride for the program instruction to reach a stride confidence, the one or more statistics being associated with the program counter and including the elapsed time; and adjust the pre-fetch degree of the cache pre-fetch requests for the program instruction based on the one or more statistics including the elapsed time.

19. An apparatus for pre-fetching data, the apparatus comprising:

a processor core;

a pre-fetch logic circuit in communication with the processor core, the pre-fetch logic circuit being configured to:

generate cache pre-fetch requests for a program instruction identified by a program counter;

track one or more statistics with respect to the cache pre-fetch requests;

link the one or more statistics with the program counter; and determine a pre-fetch degree of the cache pre-fetch requests for the program instruction based on the one or more statistics; and a memory hierarchy in communication with the processor core and the pre-fetch logic circuit, the memory hierarchy comprising:

a main memory;

a hierarchy of caches; and a memory controller configured to pre-fetch memory blocks identified in the cache pre-fetch requests, the memory blocks being pre-fetched from a current level in the memory hierarchy into a higher level of the memory hierarchy, wherein the pre-fetch logic is further configured to:

store the program counter in association with a memory block that is pre-fetched into a cache at the higher level of the memory hierarchy in response to one of the cache pre-fetch requests;

track a pre-fetch usefulness feedback that indicates whether the memory block in the cache at the higher level of the memory hierarchy is demanded by a processor, wherein the one or more statistics comprise the pre-fetch usefulness feedback;

associate the program counter with the pre-fetch usefulness feedback; and determine the pre-fetch degree of the cache pre-fetch requests for the program instruction identified by the program counter based on the pre-fetch usefulness feedback associated with the program counter.

* * * * *

UNITED STATES PATENT AND TRADEMARK OFFICE
CERTIFICATE OF CORRECTION

PATENT NO. : 11,983,116 B2
APPLICATION NO. : 17/973427
DATED : May 14, 2024
INVENTOR(S) : Do et al.

Page 1 of 1

It is certified that error appears in the above-identified patent and that said Letters Patent is hereby corrected as shown below:

In the Claims

Column 21, Line 60: Please replace "claim 3" with -- claim 4 --.

Column 22, Line 26: Please replace "claim 7" with -- claim 8 --.

Signed and Sealed this
Eighteenth Day of June, 2024

*Katherine Kelly Vidal*

Katherine Kelly Vidal
*Director of the United States Patent and Trademark Office*